United States Patent [19]

Taylor

[11] 3,861,931

[45] Jan. 21, 1975

[54] OPAQUE CELLOPHANE FOR IMPROVED KEEPING

[75] Inventor: John S. Taylor, Newark, Del.

[73] Assignee: FMC Corporation, Philadelphia, Pa.

[22] Filed: July 20, 1972

[21] Appl. No.: 273,449

[52] U.S. Cl............. 106/165, 99/171 LE, 106/168, 252/300
[51] Int. Cl....................... C08b 21/20, G02b 1/00
[58] Field of Search ............ 106/165, 168; 252/200; 99/171 LE

[56] References Cited
UNITED STATES PATENTS

| | | | |
|---|---|---|---|
| 2,304,754 | 12/1942 | Wainer | 252/300 |
| 2,650,168 | 8/1953 | Van Dijk et al. | 106/165 |
| 2,706,689 | 4/1955 | Agulhon | 106/165 |
| 2,839,420 | 6/1958 | Hay | 106/165 |
| 2,950,207 | 8/1960 | Jones | 106/193 J |

FOREIGN PATENTS OR APPLICATIONS

| | | | |
|---|---|---|---|
| 126,292 | 1/1948 | Australia | 99/171 LE |
| 886,761 | 1/1962 | Great Britain | 99/171 LE |

*Primary Examiner*—Allan Lieberman

[57] ABSTRACT

A regenerated cellulose film having incorporated therein titanium dioxide and carbon black which together cooperate to reduce the transmission of visible light through such film.

7 Claims, No Drawings

OPAQUE CELLOPHANE FOR IMPROVED KEEPING

The present invention relates to regenerated cellulose films having reduced light transmission characteristics and to a process for making the same.

Known in the art are transparent regenerated cellulose films which extend the keeping time or shelf life of packaged oil-containing food products, such as potato chips, crackers, cakes, butter, candies and nuts. For example, in an article appearing in Industrial and Engineering Chemistry, Vol. 27, No. 11, pages 1287–1290, dated Nov. 1935, Willard L. Morgan points out that light is often the prominent factor in the rapid development of oxidation rancidity of oily products. In this publication much data is provided in support of the author's conclusion that light transmitted through transparent regenerated cellulose films which are blue in color has an accelerating effect in causing rancidity of oil-containing food products, while no such accelerating effect is evident when such products are packaged in like transparent regenerated cellulose films which are yellow or red in color.

Presently available to the packaging industry are decorative white regenerated cellulose films which have the brightness and gloss of transparent regenerated cellulose films and which are described as being "opaque." Such white regenerated cellulose films, however, do permit the passage of about 40 percent of visible light and, accordingly, a primary object of this invention is to provide a generally new or improved and more satisfactory opaque regenerated cellulose film and a process for making the same.

Another object is the provision of a regenerated cellulose film for use in wrapping oily food products, which film has improved rancidity-retarding properties.

Still another object is the provision of a pigmented regenerated cellulose film having improved light obstructing properties.

A further object is the provision of a pigmented regenerated cellulose film through which essentially no visible light is transmitted.

These and other objects are accomplished in accordance with the present invention by a regenerated cellulose film which has incorporated therein pigments of titanium dioxide and not more than about 2.0 percent carbon black, based upon the weight of cellulose and pigments, with the combination of titanium dioxide and carbon black pigments being together present in an amount sufficient to reduce the transmission of visible light through such film by at least 80 percent. Unless otherwise stated all pigment concentrations hereafter mentioned are based upon the weight of the cellulose and pigments in the particular regenerated cellulose film to which reference is being made. As understood in the art, the terms "opaque" and "opacity" are both employed in a relative sense, as referring to films which permit only a partial transmission of visible light and substantially less than that transmitted through transparent or translucent regenerated cellulose films.

More specifically, the regenerated cellulose film of the present invention includes from about 8.0 to 15.0 percent of titanium dioxide and from about 0.25 to 2.0 percent of carbon black and, for optimum light-obstructing characteristics, a mixture of about 2.0 percent of carbon black is preferred.

The incorporation of titanium dioxide alone in regenerated cellulose films is well known, with generally from about 8 to 12 percent of titanium dioxide, based upon the weight of cellulose being employed in conventional white regenerated cellulose films. In such films, reducing or increasing the amount of titanium dioxide from the range mentioned provides, on the one hand, a white regenerated cellulose film which is of reduced opacity and, on the other hand, a white regenerated cellulose film which exhibits a definite sacrifice in certain of its physical properties without any significant improvement in its light obstructing characteristics.

While channel black is the only form of carbon black which is presently acceptable in films which are intended for use with food products, it will be understood that either channel black or furnace black may be employed in the regenerated cellulose films of the present invention. Thus, unless otherwise stated, the terminology "carbon black" as used herein is intended to include both channel and furnace black.

Unfortunately, all forms of channel black will thicken conventional viscose solutions very severely. Even channel blacks which are least objectionable in this respect, such as "Monarch 74" cannot be employed in concentrations greater than 2.0 percent without interfering with film extrusion operations.

Viscose solutions having carbon black in a concentration of less than 0.25 percent provides for a regenerated cellulose film which exhibits light obstructing properties similar to those of conventional white regenerated cellulose films. On the other hand, incorporating 2.0 percent of carbon black into a conventional viscose solution, which is the practical maximum amount of carbon black permitted for satisfactory extrusion operations, does not by itself impart to the resulting regenerated cellulose film a desired degree of opacity. Accordingly, to achieve the above-stated objects it is essential that both carbon black and titanium dioxide be incorporated into the regenerated cellulose films of the present invention.

Either anatase or rutile titanium dioxide may be employed in the manufacture of the films of the present invention, with the latter being preferred in view of its better hiding power per unit weight. Rutile forms of titanium dioxide which are suitable include Titanox 2055, which is predispersed, and Titanox 2015, both of which are produced by the Titanium Pigment Division of N.L. Industries. The titanium dioxide may be present in amounts equal to or greater than that as is normally employed in conventional white regenerated cellulose films and serves to supplement the opacity, as well as to temper the color or appearance, which is imparted to the resulting film by the contained carbon black.

In the process of the present invention, the titanium dioxide and carbon black are in finely comminuted form and are dispersed separately. For example, an aqueous dispersion containing 70 percent titanium dioxide, such as Titanox 2015, may be provided using a high shear mixer and about 0.2 percent of sodium tripolyphosphate as a dispersant. Similarly, the acidic carbon black, in concentrations of from 20 to 30 percent, may be readily dispersed in water using a suitable dispersant, such as Tamol 731, a sodium salt of polymeric carboxylic acid, available from Rohm and Haas Co., Philadelphia, Pa. The two separately prepared dispersions are then mixed in desired concentrations with such mixture being injected into a film-forming viscose solution immediately prior to its passage through an extrusion nozzle. Normally, the average size of the titanium dioxide particles is about 0.2 to 0.3 micron, while the carbon black particles are generally about 0.015 to 0.017 micron in size, and thus no extraordinary techniques or equipment are required in the extrusion process.

Conventional, film-forming viscose solutions are well known and, in general, are formed by reacting carbon disulfide with alkali cellulose and then mixing the resulting sodium cellulose xanthate with dilute sodium hydroxide. A typical coagulating bath for such viscose solution includes 62 percent water, 13 percent sulfuric acid and 25 percent sodium sulfate. After coagulation and subsequent wet processing, the formed wet gel cellulose layer is plasticized, usually by passage through an aqueous bath containing a plasticizing compound, as for example, glycerine, urea, propylene glycol and polyethylene glycols of various molecular weights.

Aside from imparting opacity, the titanium dioxide and carbon black pigments which are employed in the present invention readily withstand the strong caustic, acid and bleaching mediums used in the production of regenerated cellulose films and do not bleed from the finished film or at any time during its manufacture.

To further illustrate the merits of the present invention, reference is made to the following example.

Separate aqueous dispersions of rutile titanium dioxide and carbon black were prepared using sodium tripolyphosphate and Tamol 731, respectively, as dispersants. The carbon black employed was Monarch 74 having a surface area of 320 meters/gram; particle size of 17 millimicrons, as determined by electron microscope; and an oil absorption (dibutyl phthalate) of 133 cc/100 grams. For convenience, and as set forth in the following table, all dispersions were made identical to the concentrations of pigments desired in the different regenerated cellulose films which were to be prepared, designated below as Film Sample A through G.

The prepared dispersions were injected into a conventional film-forming viscose solution in separate runs, with the titanium dioxide and carbon black dispersions for Film Sample B through F being mixed together prior to such injection. In all runs, injection was effected immediately prior to the passage of the viscose solution into and through a flat extrusion die.

All extrusion runs were made under substantially the same conditions. More specifically, each pigmented viscose solution was extruded at a rate of 230 grams per minute, with the extrudant being passed through conventional coagulating, regenerating, bleach and wash baths, plasticized using an 8.0 percent glycerine bath, and then collected at a rate of 16 feet per minute. The resulting film had a thickness of about 0.85 mils.

Each of the resulting uncoated regenerated cellulose films was tested for luminous transmission according to ASTM method D-1003, using a Gardner Model UX-10 Pivotable-Sphere Hazemeter and a standard light source. The results of these tests together with the color of the respective regenerated cellulose films were as follows:

| Film Sample | % Channel Black | % Titanium Dioxide | % Luminous Transmission | Film Color |
| --- | --- | --- | --- | --- |
| A | 0.0 | 8.0 | 39.7 | White |
| B | 0.25 | 8.0 | 18.4 | Light Grey |
| C | 0.50 | 8.0 | 11.5 | Grey |
| D | 1.0 | 8.0 | 5.9 | Dark Grey |
| E | 2.0 | 8.0 | 0.1 | Black |
| F | 0.25 | 15.0 | 12.0 | Light Grey approach white |
| G | 0.0 | 15.0 | 28.9 | White |

As is apparent from the above data, the presence of relatively small concentrations of carbon black provides for an appreciable difference in the opacity of the resulting regenerating cellulose film. For example, Film Sample B includes only 0.25 percent of carbon black yet its light transmission is less than one-half of that which is permitted through conventional white film, Film Sample A. Film Sample E provides for maximum opacity and is preferred for use with oil-containing products.

While specific reference has been made to Monarch 74 channel black, it will be understood that other channel blacks having characteristics similar to those of Monarch 74 may be employed with equally satisfactory results.

Desirably, the films of the present invention are printed with a white or colored ink or are laminated or extrusion-coated, for example with a white polyolefin, at least along the sides thereof which are to form the outside surfaces of wrapped packages. Such printing, lamination or coating provides for a more attractive package and may well serve to further reduce the transmission of light through such films.

The films of the present invention are preferably coated with a vinylidene chloride copolymer resin (saran) to impart good grease resistance and low moisture vapor transmission characteristics thereto. Such vinylidene copolymer resins include copolymers predominantly of vinylidene chloride with a copolymerizable monomer or monomers as for example, acrylonitrile, vinyl chloride, acrylic and methacrylic acid, alkyl esters of these acids, itaconic acid.

Lacquers of the vinylidene chloride copolymer resins are prepared with solvents including for example, tetrahydrofuran, methylethyl ketone and the like. Diluents such as toluene, xylene and benzene may also be employed in the lacquer. The saran lacquer may contain additives to improve the coating properties including slip agents, waxes and the like.

It is to be understood that changes and variations may be made without departing from the spirit and scope of the invention as defined in the appended claims.

I Claim:

1. A regenerated cellulose film for use in wrapping of oil-containing food products, said film having incorporated therein pigments of from about 8 to 15 percent of titanium dioxide and from about 0.25 to 2 percent of carbon black, based on the weight of cellulose and pigments, said titanium dioxide pigment being present as particles having an average size of not less than about 0.2 microns, the combination of titanium dioxide and carbon black together reducing the transmission of visible light through such film by at least 80 percent.

2. A regenerated cellulose film as defined in claim 1 having incorporated therein not less than 1.0 percent of carbon black, based on the weight of cellulose and pigments.

3. A regenerated cellulose film as defined in claim 1 having incorporated therein about 8.0 percent of titanium dioxide and about 2.0 percent of carbon black, based on the weight of the cellulose and pigments, said film being substantially opaque to visible light.

4. A regenerated cellulose film as defined in claim 1 wherein said titanium dioxide is of the rutile form.

5. A regenerated cellulose film as defined in claim 1 wherein said carbon black is channel black.

6. A regenerated cellulose film as defined in claim 4 wherein said carbon black is channel black.

7. A process which comprises separately and uniformly dispersing in water finely comminuted particles of titanium dioxide, having an average size of not less than about 0.2 microns, and carbon black, mixing the two dispersions, and injecting the mixture into a viscose solution immediately prior to its passage through a film extrusion nozzle and into an acid regenerating bath to produce an opaque regenerated cellulose film, said separate dispersions of titanium dioxide and carbon black being mixed in such concentrations as to have incorporated in the resulting opaque regenerated cellulose film from about 8 to 15 percent titanium dioxide particles and from about 0.25 to 2.0 percent carbon black particles, based upon the weight of the cellulose and particles.

* * * * *